`US006878229B2`

United States Patent
Lohwasser et al.

(10) Patent No.: US 6,878,229 B2
(45) Date of Patent: *Apr. 12, 2005

(54) STERILIZIBLE COMPOSITE FILM FOR PACKAGING PURPOSES

(75) Inventors: Wolfgang Lohwasser, Gailingen (DE); Olaf Frei, Siblingen (CH)

(73) Assignee: Alcan Technology & Management Ltd., Neuhausen am Rheinfall (CH)

(*) Notice: Subject to any disclaimer, the term of this patent is extended or adjusted under 35 U.S.C. 154(b) by 0 days.

This patent is subject to a terminal disclaimer.

(21) Appl. No.: 10/318,091

(22) Filed: Dec. 13, 2002

(65) Prior Publication Data

US 2003/0091840 A1 May 15, 2003

Related U.S. Application Data

(62) Division of application No. 09/856,573, filed as application No. PCT/EP99/09393 on Dec. 2, 1999, now Pat. No. 6,652,957.

(30) Foreign Application Priority Data

Dec. 8, 1998 (EP) .............................. 98811206

(51) Int. Cl.⁷ .......................... B32B 7/02; B32B 31/06; B32B 31/22
(52) U.S. Cl. ...................... 156/276; 156/278; 156/279; 428/216; 428/451
(58) Field of Search ............................... 156/276, 279, 156/278, 244.11, 308.4, 290; 428/216; 427/162, 225.37, 535

(56) References Cited

U.S. PATENT DOCUMENTS 3,442,686 A * 5/1969 Jones .......................... 428/336
5,084,356 A * 1/1992 Deak et al. .................. 428/458
5,100,720 A * 3/1992 Sawada et al. .............. 428/215
5,508,075 A * 4/1996 Roulin et al. ............... 428/35.7
5,670,224 A 9/1997 Izu et al.
5,770,301 A * 6/1998 Murai et al. ................ 428/213
5,830,545 A 11/1998 Frisk
5,955,181 A * 9/1999 Peiffer et al. ............... 428/212
6,027,793 A * 2/2000 Lohwasser et al. ......... 428/216
6,277,496 B1 * 8/2001 Lohwasser et al. ......... 428/469
6,428,882 B1 * 8/2002 Peiffer et al. ............... 428/220
6,517,932 B1 * 2/2003 Peiffer et al. ............... 428/216
6,548,108 B1 * 4/2003 Lohwasser et al. ......... 427/162

FOREIGN PATENT DOCUMENTS

EP     0 484 275 A1    10/1991
WO    98/53115    * 11/1998

OTHER PUBLICATIONS

Abstract, Section Ch., Week 9325, Derwent Publications, Ltd., AN 93–201537.

* cited by examiner

Primary Examiner—Melvin C. Mayes
(74) Attorney, Agent, or Firm—Fisher, Christen & Sabol

(57) ABSTRACT

A film composite for packaging purposes. The film composite efficiently blocks the passage of water vapor and gas after sterilization in a water bath or in water vapor at temperatures of more than 90° C., and is a film consisting of polyethylene terephthalate (PET) with a coextruded layer consisting of polyethylene-2,6-naphthalate (PEN) on at least one side. The film has a 10 nm to 200 nm thick ceramic layer on at least one of the sides that are coated with PEN. The layer is produced by simultaneously vaporizing silicon dioxide ($SiO_2$) and metallic silicon in a vacuum. The layer consists of $SiO_x$, x being a number between 0.9 and 2. The composite film blocks the passage of water vapor and gases to a large extent after sterilization in a water bath or in water vapor at temperatures of more than 90° C. A process for preparing the film composite.

16 Claims, No Drawings

STERILIZIBLE COMPOSITE FILM FOR PACKAGING PURPOSES

This application is a division of U.S. Ser. No. 09/856,573, filed on May 24, 2001 now U.S. Pat. No. 6,652,957 that is a 371 U.S. National Stage Application of PCT/EP99/09393, filed on Dec. 2, 1999, that has priority benefit of European Patent Application 98811206.6, filed on Dec. 8, 1998

BACKGROUND OF THE INVENTION

1. Field of the Invention

The invention concerns a composite film for packaging purposes with good permeability barrier effect for water vapor and gases after sterilization in a water bath or in water vapor at temperatures of more than 90° C., where the composite film also has as a substantial constituent a barrier layer with $SiO_x$ which is produced by the vaporization of inorganic materials. Also within the framework of this invention lies a process for the production of the composite film and its usage.

2. Background

In a recognized method of prolonging the durability of perishable products such as foodstuffs, the products are sterilized in a packaged state. To achieve this the filling material is heated briefly in its sealed packaging by autoclaving in hot water or water vapor at temperatures of up to 130° C.

The known transparent composite films used today for packaging foodstuffs often lack sufficient barrier properties to water vapor, oxygen and aromas after sterilization treatment. Examples are ethylvinyl alcohols (EVOH) and copolymers of EVOH and polyethylene (PE), the barrier properties of which deteriorate especially in very moist conditions, resulting in a milky appearance. Better barrier properties are achieved by coating a silicon monoxide-coated film of polyethylene terephthalate, but when heated at high temperatures these films show not only a yellowish discoloration but also a decrease in barrier properties.

BROAD DESCRIPTION OF THE INVENTION

The invention is therefore based on the task of creating a composite film of the type described initially which shows improved barrier properties with regard to water vapor, oxygen and aromas after sterilization treatment in comparison with state of the art transparent film laminates.

The solution of the task according to the invention leads to the composite film comprising a film of polyethylene terephthalate (PET) with a coextruded layer of polyethylene-2,6-naphthalate (PEN) on at least one side, and the film on at least one of the PEN-coated sides has a 10 to 200 nm thick ceramic layer of $SiO_x$, where x is a number between 0.9 and 2, produced by the simultaneous vaporization of silicon dioxide ($SiO_2$) and metallic silicon in a vacuum.

The term PEN is used below to mean not only the pure polymer but also a mixture of polymers consisting of at least 60 w. % ethylene-2,6-naphthalate units and up to 40 w. % ethylene terephthalate units and or units of cycloaliphatic or aromatic diols and or dicarbonic acids.

DETAILED DESCRIPTION OF THE INVENTION

The preferred PEN layer has a polymer consistency of at least 65 w. % ethylene-2,6-naphthalate units and up to 35 w. % ethylene terephthalate units. Particularly preferred is a PEN layer with a polymer consistency of at least 70 w. % ethylene-2,6-naphthalate units and up to 30 w. % ethylene terephthalate units. As stated above, the PEN layer can, however, consist entirely of ethylene-2,6-naphthalate polymers.

Suitable aliphatic diols are for example diethylene glycol, triethylene glycol, aliphatic glycols of the general formula $HO-(CH_2)_n-H$, whereby n is an integer between 3 and 6 (in particular propane-1,3-diol, butane-1,4-diol, pentane-1,5-diol, and hexane-1,6-diol) or branched chain aliphatic glycols with up to 6 carbon atoms. Suitable cycloaliphatic diols include cyclohexane diols (in particular cyclohexane-1,4-diol). Other suitable aromatic diols correspond for example to the formula $HO-C_6H_4-X-C_6H_4-OH$, where X stands for $-CH_2-$, $-C(CH_3)_2-$, $-C(CF_3)_2-$, $-O-$, $-S-$, or $SO_2$. In addition to the above, bisphenols of the formula $HO-C_6H_4-C_6H_4-OH$ are suitable.

Preferred aromatic dicarbonic acids are benzo-dicarbonic acids, naphthalene dicarbonic acids (for example, naphthalene-1,4 or 1,6-dicarbonic acids), biphenyl-x,x'-dicarbonic acids (in particular, biphenyl 4,4'-dicarbonic acids), diphenylacetylene-x,x'-dicarbonic acids (in particular, diphenylacetylene-4,4'-dicarbonic acids) or stilbene-x,x'-dicarbonic acids. Of the cycloaliphatic dicarbonic acids, cyclohexane dicarbonic acids should be mentioned. Of the aliphatic dicarbonic acids the ($C_3$–$C_{19}$) alkane diacids are particularly suitable, when the alkane part is either in a straight chain or can be branched.

A preferred method of producing PEN/PET film includes the following steps:
a) production of the film by coextrusion,
b) biaxial extension of the film, and
c) thermofixing of the extended film.

The PEN layer can be arranged on one or both sides of the PET film. A unilateral attachment of the PEN layer is preferred where a further layer of PET containing extra antiblocking agents can be attached to the side facing away from the PEN layer.

The PEN layer preferably has a thickness of 0.1 to 4 μm, in particular 0.2 to 2 μm. The preferred thickness of the ceramic layer of $SiO_x$ lies between 40 and 150 nm.

In the first preferred variant the x of the $SiO_x$ ceramic layer is a number between 0.9 and 1.2. After sterilization, a film coated in this way has an oxygen barrier which is 10 times better than that of state of the art films, although there is a degree of yellowing.

In the second preferred variant the x of the $SiO_x$ ceramic layer is a number between 1.3 and 2, in particular between 1.5 and 1.8. A film coated in this way shows even better barrier properties after sterilization treatment and in particular shows no discoloration.

Depending on its application, the composite film ultimately to be used for packaging purposes may contain, in addition to the PEN/PET film coated with $SiO_x$, further films for example films made out of PET or an oriented polyamide (oPA), or the composite film can be coated, in order to control the sealing qualities, with a sealing layer made for example of polypropylene (PP) or polyethylene (PE). The joining of the individual films into a composite film is usually achieved by means of polyurethane-based laminate adhesives.

The ceramic $SiO_x$ layers can for example be deposited onto the PEN/PET film by processes in thin-film vacuum technology, preferably by electrode beam vaporization, where in any such case, the ceramic layer is arranged as an interface layer on the PEN-coated side of the composite film and is covered by a further film layer or a laminate adhesive.

By means of a thin-film vacuum process, which is known in itself, a 10 nm to 200 nm thick ceramic layer of $SiO_x$, where x is a number between 0.9 and 2, is deposited by the simultaneous vaporization in a vacuum of silicon dioxide ($SiO_2$) and metallic silicon. The film coated with the ceramic layer is then laminated with the other films, which can also be printed, into a composite film.

It is preferable that the $SiO_2$ and Si are vaporized together from a single vaporization source, i.e., from a mixture of $SiO_2$ and Si.

To produce a ceramic $SiO_x$ layer, where x is a number between 1.3 and 2, further substances can be added to the $SiO_2$ as the materials to be vaporized, such as, $Al_2O_3$, $B_2O_3$, and MgO in quantities of up to 50 mol %, preferably 5 to 30 mol %, always in relation to $SiO_2$.

Further additives which can be added to the materials for vaporization are, for example, Al, B and or Mg in their pure form or as Si alloys, in quantities of up to 50 mol %, preferably 5 to 30 mol %, always in relation to Si.

For production of the composite film where the x of the ceramic layer of $SiO_x$ is a number between 0.9 and 1.2, quantitative ratio of $SiO_2$ to Si can be, for example, set such that stoichiometrically such quantitative ration gives an oxygen deficiency of between 10 and 30 percent in relation to the pure oxide in the vaporized material.

The quantity ratio of $SiO_2$, $Al_2O_3$, $B_2O_3$, and MgO to Si, Al, B and Mg is for example set such that stoichiometrically it gives an oxygen deficiency of between 10 and 30% in relation to the sums of the pure oxides in the vaporized material.

The coating process is controlled by the material vaporization rate, the deposit rate on the substrate and the exposure period of the substrate in the vacuum chamber atmosphere, such that it produces the desired layer thickness of the $SiO_x$ coating.

In the production of a ceramic layer of $SiO_x$, where x is a number between 0.9 and 1.2, instead of a simultaneous vaporization of $SiO_2$ and Si, silicon monoxide (SiO) can be vaporized.

A plasma pre-treatment of the PEN/PET film before the $SiO_x$ coating leads to a further improvement in barrier properties against water vapor and oxygen.

The composite film according to the invention is particularly suitable for the production of flexible packaging such as sachets and as a covering material for sealing containers. One particularly preferred application for the composite film according to the invention is for the packaging of basic and luxury food items which are sterilized in their packaged state in a water bath or water vapor at temperatures of more than 90° C.

The composite film according to the invention is also suitable for use as a barrier material in the technical and medical arenas.

The superiority of the composite film according to the invention in comparison with the usual materials in use today with regard to barrier effect against oxygen and water vapor is supported by the measurement results for the said characteristics compiled in Table 1 and Table 2.

The composite films tested have the following composition:
1. PET, coated with SiO/PET/PP
2. PET, coated with $SiO_{1.6}$/PET/PP
3. PET (12 μm)-PEN (1 μm), coextruded and coated with SiO(100 μm)/PET/PP
4. Layer structure as in 3 but coated with a ceramic layer of the $SiO_{0.6}$ compound.

Composite film No. 1 is a commercially available packaging film described as sterilizable and serves here as a comparison example. Similarly composite film No. 2 is a comparison example. Composite films Nos. 3 and 4 are the composite films according to the invention with ceramic layers of differing composition: this corresponds in composite No. 3 to the SiO formula and in composite No. 4 to the $SiO_{1.6}$ formula.

TABLE 1

Oxygen barriers at 25° C. and 50% r.h. $cm^3/(m^2$ 24 h bar)

| Composite Number | Before sterilization | After sterilization at 121° C., 30 mins | After sterilization 130° C., 30 mins | Before sterilization after 50 Gelboflex cycles* |
|---|---|---|---|---|
| 1 | 0.3 | 0.3 | 7.0 | 1.8 |
| 2 | 0.2 | 7.0 | 15.0 | 1.8 |
| 3 | 0.07 | 0.08 | 0.12 | 0.4 |
| 4 | 0.08 | 0.5 | 0.7 | 0.5 |

TABLE 2

Water vapor barriers at 25° C. and 100% r.h. in $g/(m^2$ 24 h bar)

| Composite Number | Before sterilization | After sterilization at 121° C., 30 mins | After sterilization 130° C., 30 mins | Before sterilization after 50 Gelboflex cycles* |
|---|---|---|---|---|
| 1 | 0.3 | 0.3 | 0.8 | 0.3 |
| 2 | 0.2 | 0.8 | 1.2 | 0.3 |
| 3 | 0.1 | 0.1 | 0.1 | 0.1 |
| 4 | 0.1 | 0.2 | 0.3 | 0.1 |

*standardized crushing test according to ASTM standard 397-74.

What is claimed is:

1. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 1.2, comprising depositing on a film of polyethylene terephthalate (PET) coated on at least one side with polyethylene-2,6-naphthalate (PEN), on at least one of the PEN-coated sides, a ceramic layer of $SiO_x$, where x is a number between 0.9 and 1.2, by means of the thin-film vacuum process through the simultaneous vaporization of silicon dioxide ($SiO_2$) and metallic silicon together as a mixture, wherein to the materials to be vaporized are added further additives in quantities of up to 50 mol percent, always in relation to $SiO_2$, and subsequently laminating the film coated with the ceramic layer with at least one further film on at least one of the $SiO_x$ coated PET layers to form the composite film.

2. The process according to claim 1, for production of the composite film wherein the quantitative ratio of $SiO_2$ to Si is set such that stoichiometrically such quantitative ratio gives an oxygen deficiency of between 10 and 30 percent in relation to the pure oxide in the vaporized material.

3. The process according to claim 1, wherein the PET film coated with PEN is subjected to plasma pretreatment before the $SiO_x$ coating.

4. The process according to claim 1, wherein the further additives are $Al_2O_3$, $B_2O_3$ and MgO.

5. The process according to claim 1, wherein the further additives are present in an amount of 5 to 30 mol percent, always in relation to $SiO_2$.

6. The process according to claim 1, wherein the quantitative ratio of $SiO_2$, $Al_2O_3$, $B_2O_3$, and MgO to Si, Al, B and Mg is set such that stoichiometrically such quantitative ratio gives an oxygen deficiency of between 10 and 30 percent in relation to the sums of the pure oxides in the vaporized material.

7. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 1.2, comprising depositing on a film of polyethylene terephthalate (PET) coated on at least one side with polyethylene-2,6-naphthalate (PEN), on at least one of the PEN-coated sides, a ceramic layer of $SiO_x$, where x is a number between 0.9 and 1.2, by means of the thin-film vacuum process through the simultaneous vaporization of silicon dioxide ($SiO_2$) and metallic silicon, or by vaporization of silicon monoixde (SiO) in a vacuum, wherein to the materials to be vaporized are added further additives in quantities of up to 50 mol percent, always in relation to $SiO_2$, and subsequently laminating the film coated with the ceramic layer with at least one further film on at least one of the $SiO_x$ coated PET layers to form the composite film.

8. The process according to claim 7, wherein the further additives are present in an amount of 5 to 30 mol percent, always in relation to $SiO_2$.

9. The process according to claim 7, wherein the further additives are $Al_2O_3$, $B_2O_3$ and MgO.

10. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 1.2, comprising depositing on a film of polyethylene terephthalate (PET) coated on at least one side with polyethylene-2,6-naphthalate (PEN), on at least one of the PEN-coated sides, a ceramic layer of $SiO_x$, where x is a number between 0.9 and 1.2, by means of the thin-film vacuum process through the simultaneous vaporization of silicon dioxide ($SiO_2$) and metallic silicon, or by vaporization of silicon monoxide (SiO) in a vacuum, wherein to the material to be vaporized are added further additives, in particular Al, B, and/or Mg in pure form or as Si alloy, in quantities of up to 50 mol percent, always in relation to Si, and subsequently laminating the film coated with the ceramic layer with at least one further film on at least one of the $SiO_x$ coated PET layers to form the composite film.

11. The process according to claim 10, wherein the further additives are present in an amount of 5 to 30 mol percent, always in relation to $SiO_2$.

12. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 1.2, comprising depositing on a film of polyethylene terephthalate (PET) coated on at least one side with polyethylene-2,6-naphthalate (PEN), on at least one of the PEN-coated sides, a ceramic layer of $SiO_x$, where x is a number between 0.9 and 1.2, by means of the thin-film vacuum process through the simultaneous vaporization of silicon dioxide ($SiO_2$) and metallic silicon, wherein the quantitative ratio of $SiO_2$ to Si is set such that stoichiometrically such quantitative ratio gives an oxygen deficiency of between 10 and 30 percent in relation to the pure oxide in the vaporized material, and subsequently laminating the film coated with the ceramic layer with at least one further film on at least one of the $SiO_x$ coated PET layers to form the composite film.

13. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 2, comprising subjecting at least one of the PEN-coated sides of the film of the PET coated on at least one side with PEN to plasma pretreatment, depositing on at one plasma pretreated PEN-coated side of the film of polyethylene terephthalate (PET) coated on the at least one side with polyethylene-2,6-naphthalate (PEN) a ceramic layer of $SiO_x$, where x is a number between 0.9 and 2, by means of the thin-film vacuum process through the simultaneous vaporization of silicon dioxide ($SiO_2$) and metallic silicon, or by vaporization of silicon monoxide (SiO) in a vacuum, and subsequently laminating the film coated with the ceramic layer with at least one further film on at least one of the $SiO_x$ coated PET layers to form the composite film.

14. A process for the production of a composite film for packaging purposes with good permeability barrier effect for water vapor and other gases after sterilization in a water bath or in water vapor at a temperature of more than 90° C., where the composite film also has as a substantial constituent a barrier layer with $SiO_x$ produced by the vaporization of inorganic materials, the composite film comprises a film of polyethylene terephthalate (PET) with a coextruded layer of polyethylene-2,6-naphthalte (PEN) on one side and the film on the PEN-coated sides has a 10 nm to 200 nm thick ceramic layer of $SiO_x$, where x is a number between 0.9 and 2, comprising depositing on a film of polyethylene terephthalate (PET) coated on the one side with polyethylene-2,6-napththalate (PEN) a ceramic layer of $SiO_x$, where x is a number between 0.9 and 2, by means of the thin-film vacuum process through the simultaneous vaporization of silicon dioxide ($SiO_2$) and metallic silicon, or by vaporization of silicon monoxide (SiO) in a vacuum, and subsequenty laminating the film coated with the ceramic layer with at least one further film on the surface of the $SiO_x$ coating located away from the PEN film, the at least one further film comprises (i) a PET layer next to the $SiO_x$ coating and (ii) a polypropylene layer.

15. A composite film for packaging purposes with good permeability barrier effect of water vapor and other gases after sterilization in a water bath or in water vapor at room temperature of more than 90° C., where the composite film also has, as a substantial constituent, a barrier layer with $SiO_x$ produced by the vaporization of inorganic materials, the composite film comprises a film of polyethylene terephthalate (PET) with a coextruded layer of polyethylene-2,6-naphthalate (PEN) on at least one side, the PEN layer has a thickness of 0.1 to 4 μm, at least one of the PEN coated sides has a 40 nm to 150 nm thick ceramic layer of $SiO_x$, where x is a number between 0.9 and 1.2, produced by simultaneous vaporization of silicon dioxide ($SiO_2$) and metallic silicon or by vaporization of silicon monoxide (SiO) in a vacuum, and at least one further film laminated on either or both of the $SiO_x$ coated PET layers.

16. A composite film for packing purposes with good permeability barrier effect of water vapor and other gases after sterilization in a water bath or in water vapor at room temperature of more than 90° C., where the composite film also has, as a substantial constituent, a barrier layer with $SiO_x$ produced by the vaporization of inorganic materials, the composite film comprises a film of polyethylene terephthalate (PET) with a coextruded layer of polyethylene-2,6-naphthalate (PEN) on one side, the PEN coated side has a 10 nm to 200 nm thick ceramic layer of $SiO_x$, where x is a number between 0.9 and 2, produced by simultaneous vaporization of silicon dioxide ($SiO_2$) and metallic silicon or by vaporization of silicon monoxide (SiO) in a vacuum, and at least one further film laminated on the surface of the $SiO_x$ coating located away from the PEN film, the at least one further film comprises (i) a PET layer next to the $SiO_x$ coating and (ii) a polypropylene layer.

\* \* \* \* \*